April 26, 1938.          C. E. ROGERS          2,115,470
METHOD OF DEODORIZING AND PASTEURIZING LIQUIDS
Filed July 2, 1934          2 Sheets-Sheet 1
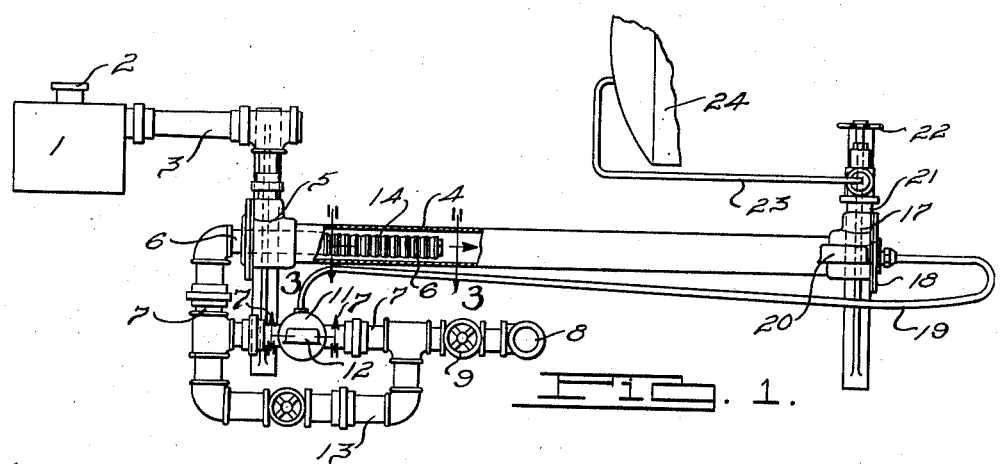
FIG. 1.
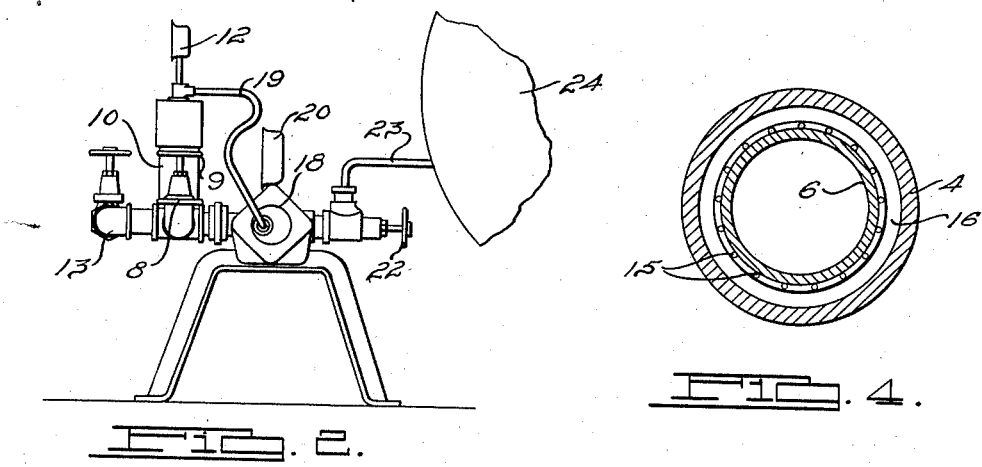
FIG. 2.          FIG. 4.
FIG. 3.
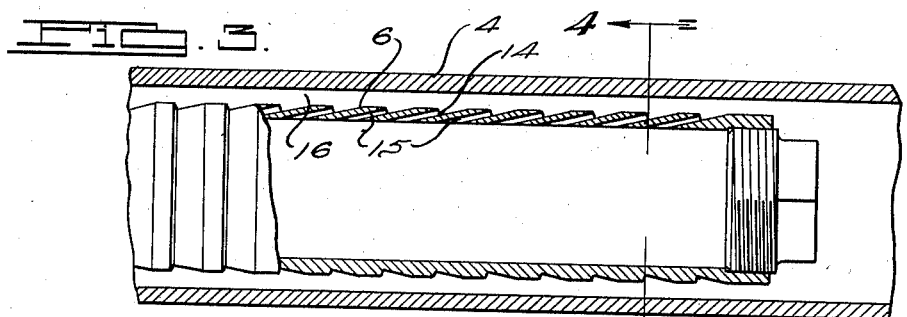
INVENTOR.
Charles E. Rogers.
BY
Charles E. Wiser
ATTORNEY.

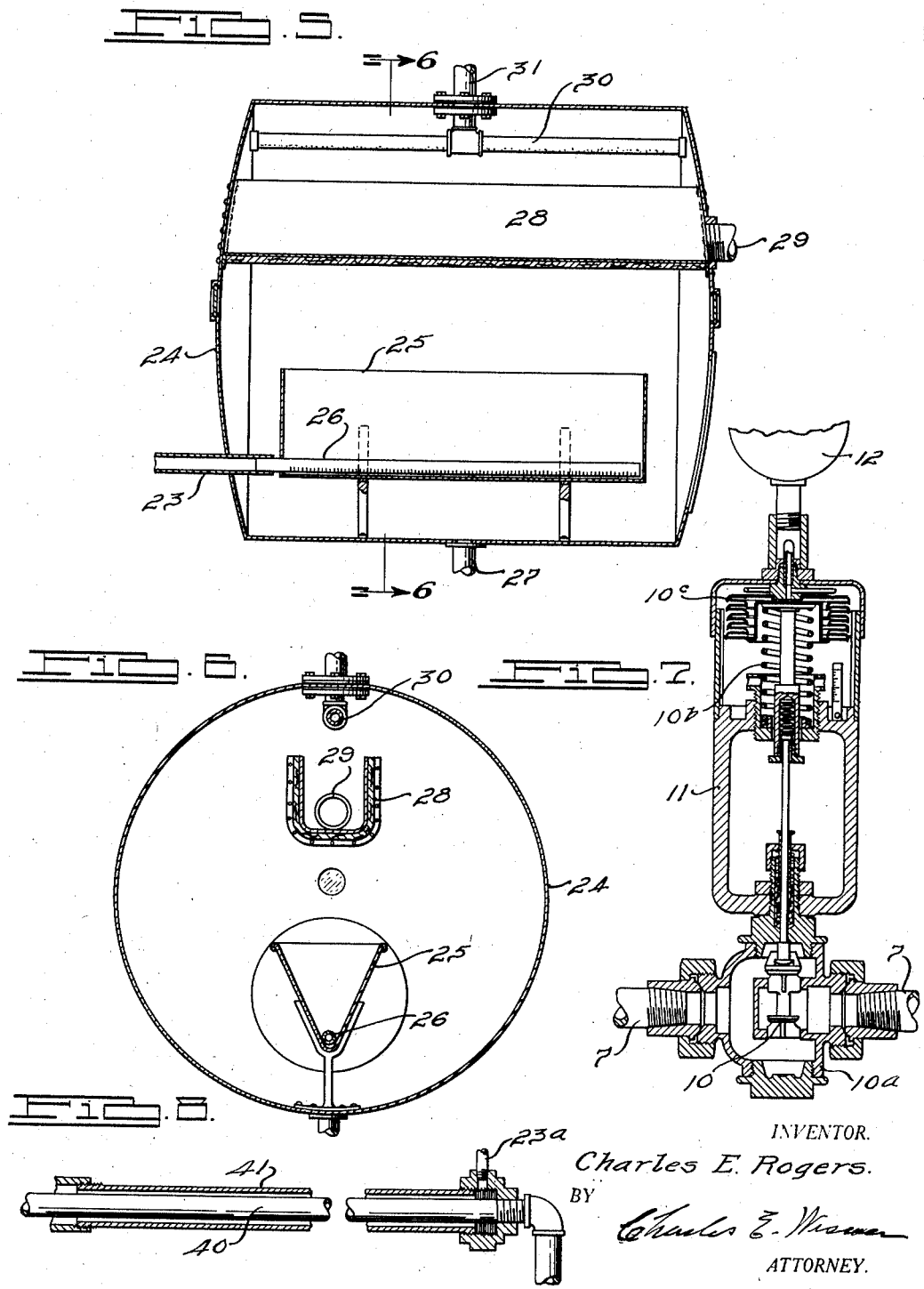

Patented Apr. 26, 1938

2,115,470

UNITED STATES PATENT OFFICE 2,115,470

METHOD OF DEODORIZING AND PASTEURIZING LIQUIDS

Charles E. Rogers, Novi, Mich.

Application July 2, 1934, Serial No. 733,434

7 Claims. (Cl. 99—61)

This invention relates to a method for treating milk and cream to render the same practically non-sporiparous and may be employed in treatment of other liquids containing bacteria practically without change in the method of treatment.

Heretofore, milk and cream have been subjected to what is known as the "pasteurizing process" in which the liquid is heated to a temperature not higher than 185 degrees Fahrenheit which is understood by the trade to be practically the highest temperature to which milk and cream may be subjected without detrimental chemical or physical change. Such treatment, however, does not eliminate the spores and this invention seeks to provide a process and apparatus for performing the same by which the milk or cream may be subjected to a temperature of practically 300 degrees F. without injury in odor or flavor or detrimental chemical change and not only are the spores practically eliminated but the deleterious odors and flavors with which milk is often contaminated are also eliminated. Thus the milk or cream that has deteriorated through development of bacteria and the freshness and flavor impaired by deleterious volatile matter may, by the process herein described, be eliminated and a product secured that has the odor and flavor of fresh milk or cream which will be retained for a materially greater period than is the case with pasteurized milk or cream.

The object of the invention therefore is to provide a process and apparatus wherein the milk and cream may be raised to a temperature approximately 300 degrees F. without production of detrimental odor, taste or deleterious physical or chemical change and thereby practically freeing the milk of bacteria producing spores.

I have discovered that it is possible to heat milk and cream to practically 300 degrees F. without detriment providing the heating and subsequent cooling are sufficiently rapid, that is, the time of heating to above a pasteurizing temperature and cooling to said temperature is performed in the neighborhood of three seconds of time.

The feature of the invention resides not only in the method whereby milk and cream may be heated to so high a degree but consists further in the apparatus for heating the liquid wherein it may be uniformly heated throughout its mass to the high temperature and in association with which is provided a means for practically instantaneously discharging the heat from the fluid which may thereafter be cooled to any desired degree.

These and other objects and various novel features of the invention and apparatus for performing the process are hereinafter more fully described and claimed, and the preferred form of apparatus embodying my invention is shown in the accompanying drawings in which—

Fig. 1 is a plan view of the apparatus partially in section.

Fig. 2 is an end elevation thereof.

Fig. 3 is a sectional elevation of a portion of a convenient form of heating device.

Fig. 4 is a cross section thereof taken on line 4—4 of Fig. 3.

Fig. 5 is a sectional elevation of a convenient form of vacuum chamber utilized in the cooling of the treated milk.

Fig. 6 is a cross section taken on line 6—6 of Fig. 5.

Fig. 7 is a section taken on line 7—7 of Fig. 1 showing the steam control valve.

Fig. 8 is a longitudinal section of a different form of heater tube.

The essential characteristic of this invention resides in the means for quickly heating the milk uniformly throughout its mass to a high degree and practically instantaneously discharging the heat therefrom or at least sufficiently rapidly as to prevent a detrimental physical or chemical change in the fluid due to the heating to so high a degree. One form of heating device for quick heating of the liquid is shown principally in Figs. 1, 2 and 3 but other forms may be utilized.

The form of heater shown operates to inject steam into a comparatively thin film of liquid under treatment, it being understood that by "liquid" is meant any of the known liquids requiring such treatment to eliminate the bacteria and spores.

The apparatus shown consists of a pump 1 taking its source of supply through an inlet 2 and discharging the same through a pipe 3 into a cylinder 4. The pipe 3 is connected to a header 5 on the cylinder 4 and to this header is connected a heater tube 6 extending through the header and into the cylinder 4 part way of its length. The liquid discharged through the pipe 3 into the header lies in a thin film circumferentially of the tube 6 within the header 5 and cylinder 4. The heater tube 6 is connected to a steam supply conduit 7 and has an inlet 8 connected with a source of supply. A valve 9 may be positioned in the conduit 7 adjacent the inlet and there is also in the conduit 7 a valve 10 and in the chambered member 11 is a temperature actuated device, a convenient form of which is shown in Fig.

7. This is a common known form of temperature control valve in which a bellows member 10ᶜ is mounted in a chambered member 11 which by expansion tends to close the valve 10 in the valve housing 10ᵃ forming part of the conduit 7. There is a spring 10ᵇ tending to contract the bellows member and open the valve and on the upper end of the chamber 11 is a temperature gauge 12. The conduit 7 connects directly to the member 10ᵃ and is continued on the opposite side to connect with the heater conduit 6 and there is also a valve controlled by-pass conduit 13 connected with the inlet and passing around the temperature controlled valve 10 and connected with the portion of the conduit 7 connected to the heater conduit 6, it being desirable, as for instance in a cleaning operation, to inject live steam directly into the tube 4 and about the associated parts.

The heater conduit, particularly the portion extending into the tube 4, is provided with a series of circumferential grooves 14 in the bottoms of which apertures 15 are provided leading to the interior of the tube 6 and so inclined to the axis of the tube as to direct the steam forwardly in the direction of the arrow in the tube 4. The milk or other fluid being treated passes in the space 16 between the wall of the heater tube 6 and cylinder 4 and thus is in a thin film and is penetrated by the steam jets issuing from the apertures 15 during the period of its passing from the receiving end of the tube 4 to the end of the tube 6. Thus, due to the fluid being in a comparatively thin film and of its being passed rapidly by the pump through this space, the fluid is practically uniformly heated to the steam temperature by the time it passes the end of the tube 6. The length of this tube 4 to the header 17 should be such that, with milk or cream at least, not more than two seconds of time should elapse but this may be varied slightly without injury to the milk due to the instantaneous cooling thereof hereinafter described. The header 17 has a plate 18 at its outer face to a recess of which the tube 19 opens which tube connects to the diaphragm or expansion device in the chamber 11. A gauge, indicated at 20, is provided to enable the operator to read the temperature of the fluid at this point while the gauge 12 enables the operator to determine the temperature to which the apparatus for operating the valve 10 is subjected.

The tube 19 and bellows member 10ᶜ to which it opens are practically filled with a volatile fluid highly responsive to variations in temperature and the structure shown in Fig. 7 is so set as to maintain the temperature of the liquid being treated practically constant. When the temperature is maintained at about 300 degrees F. for a short period both the bacteria and spores are destroyed. If milk or cream is being treated the period should not exceed three seconds of time. The header also has connected therewith a discharge conduit 21 on which is a valve 22 and a conduit 23 leads from the tube 21 to and discharges into a vacuum chamber 24 which is shown diagrammatically in Figs. 1 and 2 and shown more in detail in Figs. 5 and 6. To maintain a temperature of 300 degrees in the heater tube by means of steam, the steam, as is well known, must have a pressure of about 100 pounds per square inch. The valve 22 between the heater tube 4 and the tube 23 leading to the vacuum chamber is adjustable by means of the hand wheel 22. The temperature of the fluid in the tube 4 is indicated by the gauge 20 and if the temperature is too low the valve must be closed slightly to bring up the pressure in the tube 4 in order that the desired temperature may be attained. As the liquid passes the valve 22 to the conduit 23, the pressure must drop due to the tube freely discharging to the vacuum chamber 24. The apparatus is thus controllable to maintain pressures and temperatures in the tube 4 and the drop in pressure between the tubes 4 and 23 tends to collapse and crack the spores which are still subject to the heat of the liquid before the heat is discharged therefrom in the vacuum chamber. This vacuum chamber is preferably provided with a V shaped trough 25 adjacent its bottom into which an extension 26 of the tube 23 is positioned. This tube 26 has a series of small apertures or slots therein to permit the fluid to pass freely from the tube 26 and as this fluid overflows the upper edge of the trough 25 it drops to the bottom of the vacuum chamber 24 and may be instantly drawn off through a discharge conduit 27. With milk or cream the liquid should be withdrawn quickly from influence of the vacuum as the casein and curd content tend to harden if the liquid remains in the chamber. Therefore the liquid should be constantly withdrawn therefrom as rapidly as it is discharged thereinto so no great amount of liquid is in the chamber at any time. The vacuum chamber is of a type in which there is a trough 28 extending across the same above the trough 25 and near the top of the chamber and at its end the tube 29 is provided exteriorly of the chamber which is to be understood as being connected with the vacuum pump.

A spray of water may be discharged into the trough 28 by means of a pipe 30 having a series of apertures therein and connected with a source of supply by a tube 31. This spray falls into the trough 28 and vapors rising in the vacuum chamber from the fluid discharged thereinto pass through the spray to enter the trough 28 and thus the gases are drawn off from the chamber by the vacuum pump which maintains about a twenty-five inch vacuum in the chamber 24.

Introduction of the highly heated fluid under pressure into the vacuum chamber under influence of the vacuum causes the same to practically explode and to give up its heat and to free the fluid of the deleterious odors and flavors and this cooling is practically instantaneous from approximately 300 degrees temperature of the fluid to the boiling temperature of the chamber which is ordinarily about 130 degrees and as the fluid is discharged from the vacuum chamber to the conduit 27 it may pass through a device for cooling the same materially below the temperature of the vacuum chamber.

The heater here shown injects steam directly into the body of milk, cream or other material being treated. This is not material in the case of milk or cream wherein the cream is to be used in the making of butter or where the milk is to be condensed or dried. If the milk or cream is for table use in which it is desired to be practically in its natural state, the heater device should consist of an imperforate steam tube 40 concentrically arranged in an outer tube 41 between which the fluid is to be passed in a thin film to discharge through the tube 23ᵃ to the vacuum chamber. The tubes 40 and 41 should be of sufficient length to raise the temperature of the liquid under treatment to the desired degree before discharging to the vacuum chamber.

In either form of the heater, however, the essential characteristic is in the rapidity with which the milk is raised from pasteurizing temperature to 300 degrees F. and dropped to pasteurizing temperature or below. The movement of the milk or cream when in contact with the heater conduit must be rapid to prevent its caking on the tube. Therefore the pump should be of such capacity as to place the fluid under sufficient pressure as to cause it to traverse the conduits to the point of discharge into the vacuum chamber very rapidly and the capacity of the heater is governed by the volume of fluid to be heated per unit of time and its speed of movement relative to the heating element. Thus it will be observed in recapitulation that by raising the fluid very quickly to a high degree of temperature and then discharging into a vacuum chamber of a sufficiently high degree of vacuum, the heat is practically instantly discharged from the body of fluid and in the treatment of any fluid, particularly milk and cream, this period of heating should not exceed approximately four seconds of time from the point of heating at high heat to the point of entering the vacuum chamber. Thus the pump must operate and the conduits 4, 21 and 23 should be of such length in comparison to the capacity of the pump as to cause the fluid to traverse the tube to the vacuum chamber before a detrimental physical or chemical change takes place in the fluid. Under the conditions stated, the milk or cream being treated will flow from the vacuum chamber so nearly free from spores as to be practically sterile.

From the foregoing description it is believed evident that various objects of the invention are attained by the apparatus described including the method of treatment of the liquid, and it is to be understood that various changes may be made in the apparatus and that the temperatures to which the liquid is subjected may be varied somewhat from the specific temperatures mentioned, depending somewhat upon the character of liquid being treated, without departing from the spirit and scope of the invention as set forth in the appended claims.

Having thus briefly described my improved method and apparatus for treating liquids containing bacteria and spores, what I claim and desire to secure by Letters Patent of the United States is—

1. The method of pasteurizing and deodorizing liquids which consists in causing the liquid to flow from a source of supply to a vacuum chamber in a confined stream, submitting the liquid in a portion of the stream to steam at a temperature of approximately 300 degrees F. for a short period, then abruptly reducing the pressure and continuing the liquid in a succeeding portion of the stream under its internal heat, discharging the liquid into a vacuum chamber wherein it is practically instantly reduced to below atmospheric pressure and broken up into a fog like mist, and finally separately removing the vapor and the liquid from the chamber.

2. The method of pasteurizing and deodorizing lacteal fluids which consists in causing the liquid to flow from a source of supply to a vacuum chamber in a confined stream, submitting the liquid in a portion of the stream to direct contact with steam under pressure whereby the temperature is increased to approximately 300 degrees F., for a short period and then, prior to detrimental effect from the heat, practically instantaneously reducing the pressure and continuing the liquid in a succeeding portion of the stream under its internal heat, then discharging the liquid into the vacuum chamber wherein it is practically instantaneously reduced to below atmospheric pressure and broken up into a fog-like mist and separately removing the vapor and the liquid from the vacuum chamber.

3. The method of pasteurizing and deodorizing liquids containing bacteria and spores which consists in causing the liquid to flow from a source of supply to a vacuum chamber in a confined stream, applying heat and pressure to the liquid in one portion of the stream to suddenly raise the temperature thereof to approximately 300 degrees F., then reducing pressure and permitting the liquid to continue to flow in a second portion of the stream under its internal heat, discharging the liquid from the said second section through an orifice to the vacuum chamber to reduce the pressure to below atmospheric pressure, thereby causing the liquid to enter the chamber in the form of a fog-like mist under influence of vacuum whereby the heat and volatile matter are removed and the liquid cooled to a temperature below that productive of detrimental effect, and separately removing the liquid and volatile matter.

4. The method of pasteurizing and deodorizing liquids containing bacteria and spores which consists in causing the liquid to flow from a source of supply to a vacuum chamber in a confined stream, applying heat and pressure to the liquid in one portion of the stream to suddenly raise the temperature thereof to approximately 300 degrees F., then reducing the pressure and permitting the liquid to continue to flow in a second portion of the stream under its internal heat, discharging the liquid from said second section into the vacuum chamber wherein the liquid as it enters the chamber is instantly reduced to below atmospheric pressure and the liquid broken up into a fog-like mist subject to influence of the vacuum whereby the flavors, volatile matter and heat may be removed and the clarified particles may accumulate in liquid form and removing the liquid from the vacuum chamber separately from the vapors and volatile matter.

5. The method of deodorizing and pasteurizing lacteal fluids which consists in first practically instantaneously raising the temperature thereof to approximately 300 degrees F., then practically instantaneously reducing the pressure, then discharging the same into a vacuum chamber to practically instantaneously extract the heat whereby the liquid is broken up into finely divided mist like form under influence of the vacuum, and separately withdrawing the vapors and liquids from the vacuum chamber.

6. The method of pasteurizing and deodorizing lacteal fluids which consists in causing fluid to flow from a source of supply to a vacuum chamber in a confined stream, subjecting the fluid to stages of treatment in the stream, said stages comprising a heating zone and a holding zone, subjecting the fluid to a temperature of approximately 300 degrees F., heat while under pressure in the heating zone and subjecting it to a reduced pressure while under its internal heat in the holding zone and then discharging the same to a vacuum chamber wherein, due to the degree of exhaust, the liquid is instantaneously broken up into a fine mist and reduced in temperature to materially below that detrimental to the fluid, and separately removing the vapors and the liquid from the vacuum chamber.

7. The method of deodorizing and pasteurizing lacteal fluids which consists in first practically instantaneously raising the temperature thereof to approximately 300 degrees by the injection of steam into a thin flowing body of liquid maintained under pressure, then continuing the stream in a conduit opening to a vacuum chamber whereby the pressure is reduced in the said conduit and the liquid flows in the conduit under its internal heat, discharging the fluid from the conduit to a vacuum chamber under such degree of exhaust as to practically instantaneously extract the heat and reduce the pressure to that of the vacuum chamber whereby the liquid is broken up into a finely divided mist-like form under influence of vacuum, and separately withdrawing the vapors and the liquid from the chamber.

CHARLES E. ROGERS.